(12) United States Patent
Thullen et al.

(10) Patent No.: US 6,604,725 B1
(45) Date of Patent: Aug. 12, 2003

(54) DEVICE FOR SECURING A HYDRAULIC MODULATOR TO A VEHICLE

(75) Inventors: Carlo Thullen, Kaiserslautern (DE); Michael Hellebrandt, Le Chesnay (FR); Dietmar Sommer, Sachsenheim (DE); Shawn Aaron Sullivan, Summerville, SC (US); Rene Kaiser, Mt. Pleasant, SC (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/056,377

(22) Filed: Jan. 24, 2002

(51) Int. Cl.[7] .............................. A47G 1/00; F16L 3/00
(52) U.S. Cl. .................. 248/316.5; 248/49; 248/503; 248/510; 248/680; 248/681
(58) Field of Search ........................ 248/316.5, 500, 248/503, 510, 681, 680, 229.13, 229.23, 49, 65, 74.1, 74.4, 634; 74/569; 403/321, 322.4, 329, 326

(56) References Cited

U.S. PATENT DOCUMENTS

| 1,030,200 | A |   | 6/1912 | Miller |   |
|---|---|---|---|---|---|
| 3,792,829 | A | * | 2/1974 | Fickett | 248/42 |
| 3,913,876 | A | * | 10/1975 | McSherry | 248/74 |
| 4,478,381 | A |   | 10/1984 | Pittion et al. |   |
| 4,653,716 | A | * | 3/1987 | Sakaguchi | 248/316.5 |
| 4,728,071 | A | * | 3/1988 | Salacuse | 248/316.5 |
| 4,804,158 | A |   | 2/1989 | Collins et al. |   |
| 4,955,574 | A | * | 9/1990 | Freier | 248/316.5 |
| 5,184,794 | A | * | 2/1993 | Saito | 248/68.1 |
| 5,195,717 | A |   | 3/1993 | Benz et al. |   |
| 5,234,185 | A | * | 8/1993 | Hoffman et al. | 248/56 |
| 5,423,501 | A | * | 6/1995 | Yu | 248/61 |
| 5,458,303 | A |   | 10/1995 | Ruckwardt |   |
| 5,494,245 | A |   | 2/1996 | Suzuki et al. |   |
| 5,820,048 | A | * | 10/1998 | Shereyk et al. | 248/68.1 |
| 5,833,195 | A |   | 11/1998 | Haynes |   |
| 5,857,659 | A | * | 1/1999 | Kato et al. | 248/634 |
| 6,135,398 | A |   | 10/2000 | Quesnel |   |
| 6,164,604 | A | * | 12/2000 | Cirino et al. | 248/74.3 |
| 6,250,335 | B1 | * | 6/2001 | Ohishi et al. | 137/884 |
| 6,296,236 | B1 |   | 10/2001 | Ott |   |

FOREIGN PATENT DOCUMENTS

| DE | 4324099 | 7/1994 |
| JP | 7033005 | 2/1995 |

* cited by examiner

*Primary Examiner*—Korie Chan
*Assistant Examiner*—Amy J Sterling
(74) *Attorney, Agent, or Firm*—Michael Best & Friedrich LLP

(57) ABSTRACT

A device for securing a hydraulic modulator to a vehicle includes a base for receiving a portion of the hydraulic modulator and a clamp movably connected to the base and movable between a first position, wherein the portion of the hydraulic modulator can be positioned on the base, and a second position, wherein the clamp is closed over the base to secure the portion of the hydraulic modulator to the base. The clamp includes a projection that extends over the base when the clamp is in the first position so that when the projection is engaged by the portion of the hydraulic modulator, the projection will automatically move the clamp from the first position toward the second position. In one aspect of the invention, the clamp is hinged to the base.

48 Claims, 4 Drawing Sheets

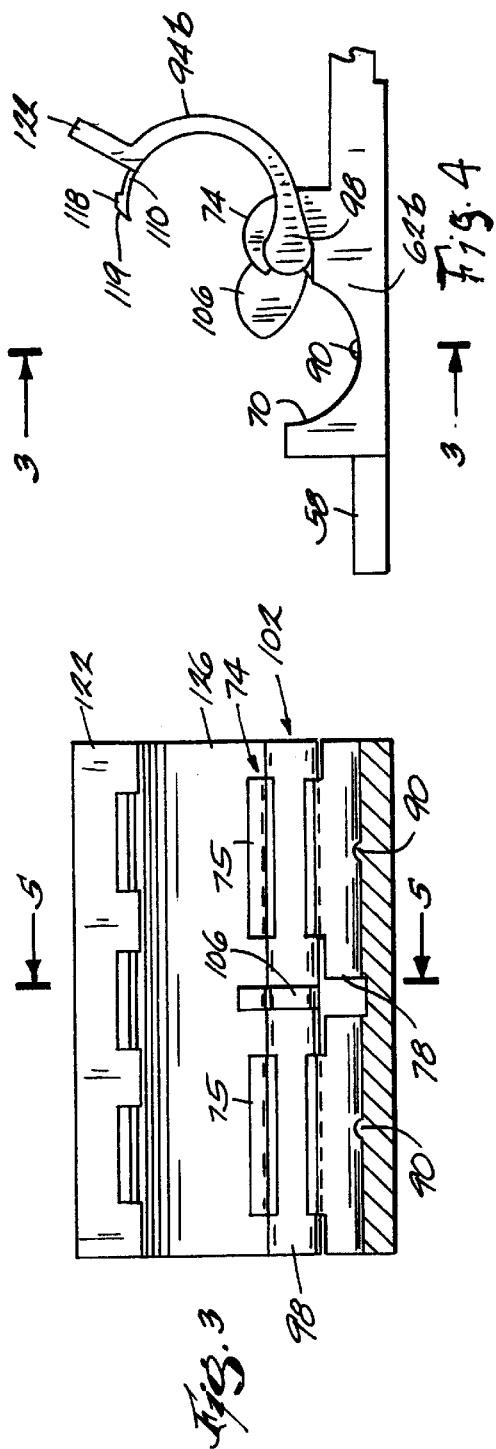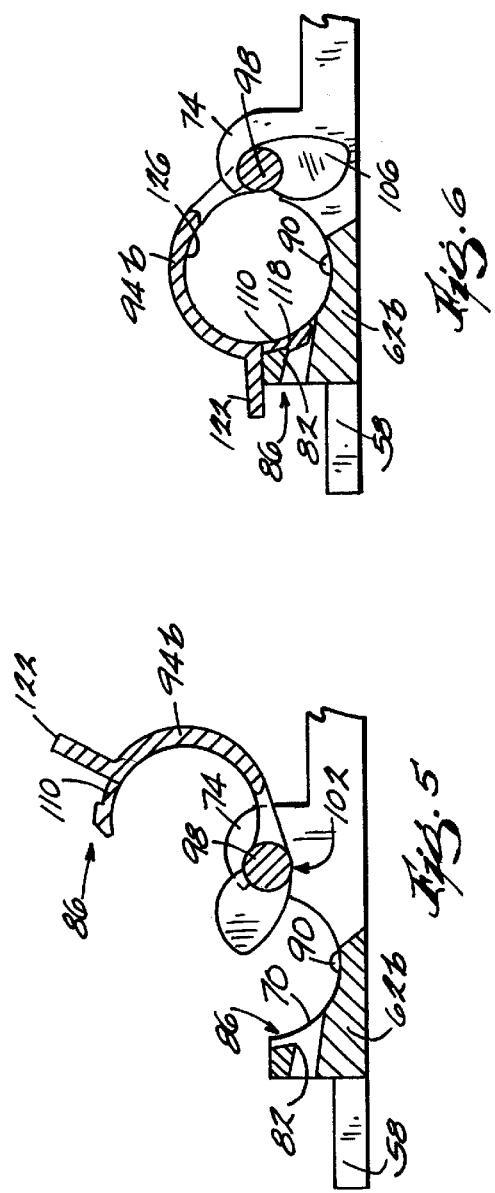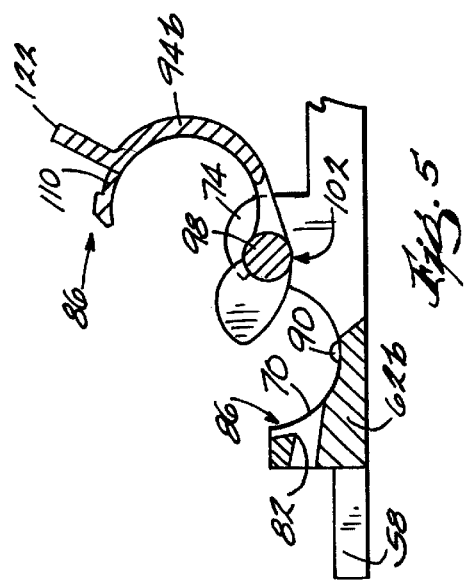

DEVICE FOR SECURING A HYDRAULIC MODULATOR TO A VEHICLE

FIELD OF THE INVENTION

The invention relates to automobiles, and more particularly to devices for securing hydraulic modulators to automobiles.

BACKGROUND OF THE INVENTION

Hydraulic modulators are used with vehicle antilock brake systems, traction control systems, and electronic stability programs. The hydraulic modulator controls the pressure of the hydraulic fluid in the system. A hydraulic modulator is typically secured and vibrationally isolated in the engine compartment of the vehicle. Current techniques typically use bolts and rubber damping elements to secure the modulator to the engine compartment of a vehicle and to isolate it from the vehicle.

SUMMARY OF THE INVENTION

Mounting a hydraulic modulator using bolts and rubber damping elements presents various problems. Typically, at least three large bolts are needed to secure the modulator to the vehicle. The modulator must be designed to accommodate the spaced-apart bolts and is often larger than otherwise necessary, solely to accommodate the bolts, thereby increasing material and manufacturing costs. In addition, the large cylindrical damping elements used to isolate the modulator take up additional valuable space in the engine compartment.

The increased size of the modulator and the damping elements makes installation in the engine compartment difficult. To further complicate installation, multiple assembly steps are required to individually position and secure the bolts and damping elements in place. This adds to the time and cost required for assembly.

In light of these problems, the invention provides an improved device and method for securing a hydraulic modulator in the engine compartment of an automobile. The device of the present invention is inexpensive to manufacture and greatly facilitates installation of the modulator in the engine compartment. No tools are required to secure the modulator in the device after the device has been mounted in the engine compartment. With this device, the size of the modulator can be reduced because no flanges or additional mounting surfaces are required for receiving large mounting bolts. With a smaller modulator, valuable space in the engine compartment is made available for other components.

More specifically, the invention provides a device for securing a hydraulic modulator to a vehicle. The device includes a base for receiving a portion of the hydraulic modulator and a clamp movably connected to the base and movable between a first position, wherein the portion of the hydraulic modulator can be positioned on the base, and a second position, wherein the clamp is closed over the base to secure the portion of the hydraulic modulator to the base. The clamp includes a projection that extends over the base when the clamp is in the first position so that when the projection is engaged by the portion of the hydraulic modulator, the projection will automatically move the clamp from the first position toward the second position.

In one aspect of the invention, the base defines a recess for receiving a portion of the hydraulic modulator. In another aspect of the invention, the clamp is movably connected to the base adjacent the recess. In yet another aspect of the invention, the base defines an additional recess and the device includes an additional clamp movably connected to the base adjacent the additional recess to receive and secure an additional portion of the hydraulic modulator.

The invention also provides an assembly including a hydraulic modulator having a substantially rigid mounting member extending therefrom. A damping element is coupled to the mounting member. The assembly further includes a device for securing the hydraulic modulator in a vehicle. The device has a base for receiving a portion of the damping element and a portion of the mounting member, and a clamp movably connected to the base and movable between a first position, where the portion of the damping element and the mounting member can be positioned on the base, and a second position, where the clamp is closed over the damping element and the mounting member to secure the hydraulic modulator to the base.

In one aspect of the invention, the hydraulic modulator includes an additional substantially rigid mounting member extending therefrom and the device includes an additional clamp movably connected to the base. In another aspect of the invention, the clamp is hinged to the base. In yet another aspect of the invention, the assembly includes a locking mechanism to secure the clamp in the second position.

The invention also provides a method of securing a hydraulic modulator in a vehicle. The hydraulic modulator includes a mounting member extending therefrom, and the method includes placing a damping element on the member and coupling a securing device to the vehicle. The securing device includes a base for receiving a portion of the damping element and a portion of the mounting member, and a clamp hingedly connected to the base and movable between a first position, where the portion of the damping element and the mounting member can be positioned on the base, and a second position, where the clamp is closed over the damping element and the mounting member to secure the hydraulic modulator to the base. The method further includes positioning a portion of the damping element on the base and moving the clamp to the second position without the use of tools.

In one aspect of the invention, the clamp includes a projection that extends over the base when the clamp is in the first position, and positioning a portion of the damping element and a portion of the mounting member onto the base includes engaging the projection with the portion of the damping element to automatically move the clamp from the first position toward the second position. In another aspect of the invention, the base includes a recess, and positioning a portion of the damping element on the base includes positioning a portion of the damping element in the recess. In yet another aspect of the invention, moving the clamp to the second position without the use of tools includes compressing the damping element between the clamp and the base.

Other features and advantages of the invention will become apparent to those skilled in the art upon review of the following detailed description, claims, and drawings.

BRIEF DESCRIPTION OF THE DRAWINGS

FIG. 3 is a section view taken through line 3—3 in FIG. 4, showing the device in the open option.

FIG. 4 is a partial side view of the device of FIG. 1.

FIG. 5 is a section view taken through line 5—5 of FIG. 3, showing the clamping portion of the device in the open position.

FIG. 6 is a view similar to FIG. 5, showing the clamping portion of the device in the closed position.

Figure 1:
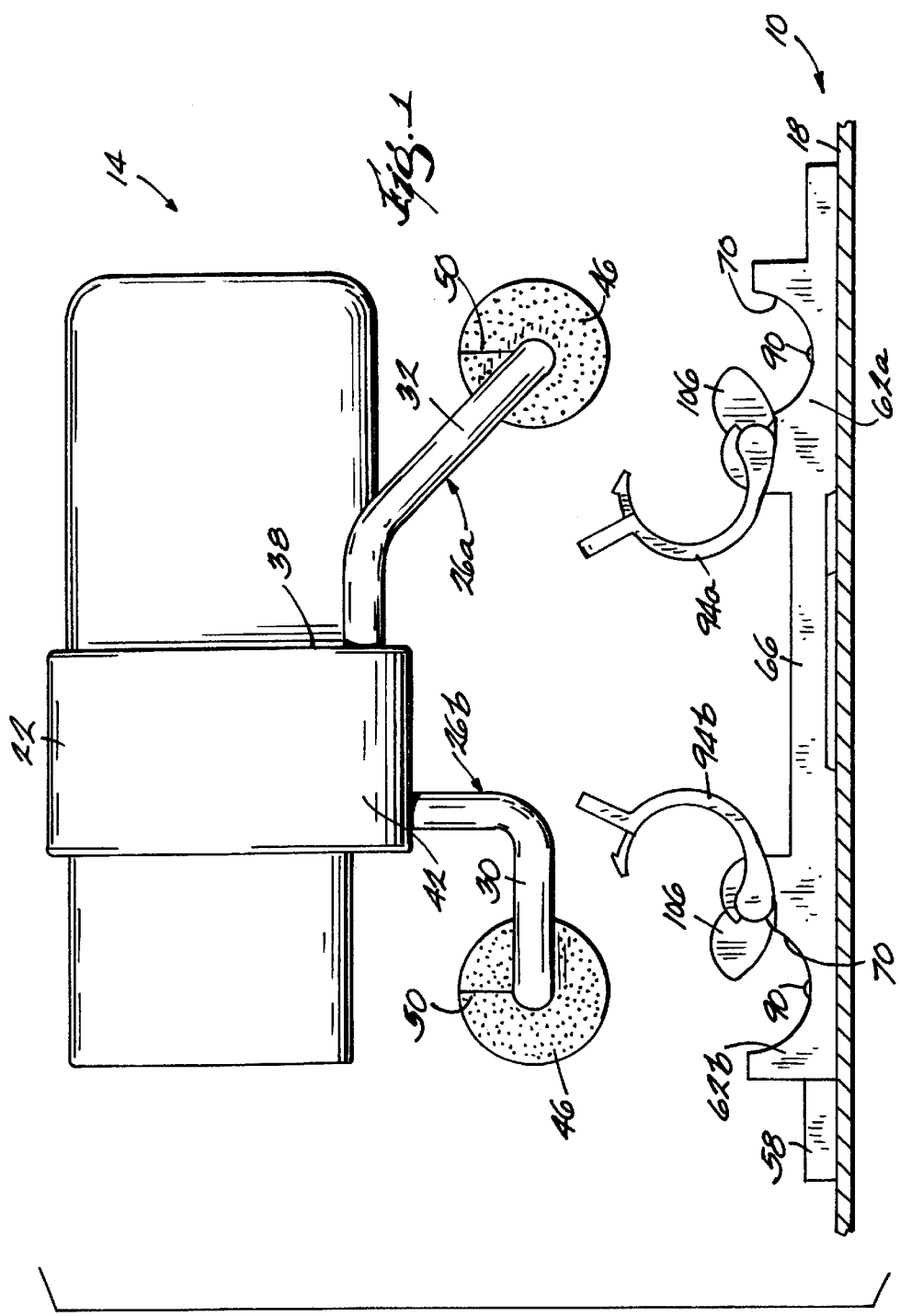
FIG. 1 is an exploded side view of the hydraulic modulator and the device for securing the hydraulic modulator in an automobile.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 1 illustrates a device 10 for securing a hydraulic modulator 14 to a mounting surface 18 of a vehicle (not otherwise shown). The hydraulic modulator 14 is mounted in the engine compartment of the vehicle and operates to control the pressure of the hydraulic fluid in the system. The device 10 is designed to receive a portion of the hydraulic modulator 14 to secure and vibrationally isolate the hydraulic modulator 14 from the vehicle. In the illustrated embodiment, the device 10 is made of plastic, however, it is understood that the device 10 can be made from metal or any other suitable material.

The hydraulic modulator 14 includes a body portion 22 and two mounting members 26a and 26b extending from the body portion 22. The mounting members 26a and 26b are preferably substantially rigid, generally U-shaped rods or tubes that are made of metal or any other suitable material. As illustrated in FIG. 1, the mounting members 26a and 26b are press fit into the body portion 22 of the hydraulic modulator 14. It is understood, however, that the mounting members 26a and 26b may be fixed to the hydraulic modulator 14 by any appropriate means, for example, by welding or other known fastening techniques.

Each mounting member 26a and 26b includes (see FIG. 2 with respect to member 26b) first and second arm portions 30 and 32, respectively, and a connecting portion 34 that connects the arm portions 30, 32 to form a U-shaped member. The arm portions 30, 32 are substantially identical to one another in both size and shape so that they form a substantially symmetrical U-shaped member.

As best seen in FIG. 1, the arms 30, 32 of the mounting member 26a (only arm 32 is shown in FIG. 1) extend from a first surface 38 of the body portion 22. In the illustrated embodiment, the arms 30, 32 extend out from the first surface 38 and then are bent downwardly, as shown. The arms 30, 32 of the mounting member 26b (only arm 30 is shown in FIG. 1) extend from a second surface 42 of the body portion 22. In the illustrated embodiment, the arms 30, 32 extend down from the second surface 42 and are then bent outwardly, as shown.

The mounting members 26a and 26b are configured such that the connecting portions 34 between the arms 30, 32 are parallel to each other when the hydraulic modulator 14 is oriented to be received in the securing device 10. It is understood, however, that the mounting members 26a and 26b could be reconfigured depending on the specific configuration of the securing device 10. While two mounting members 26a and 26b are shown in FIG. 1, it is to be, understood that only one mounting member or more than two mounting members could be used. Of course, the device 10 would be configured to receive the corresponding number of mounting members.

Figure 2:
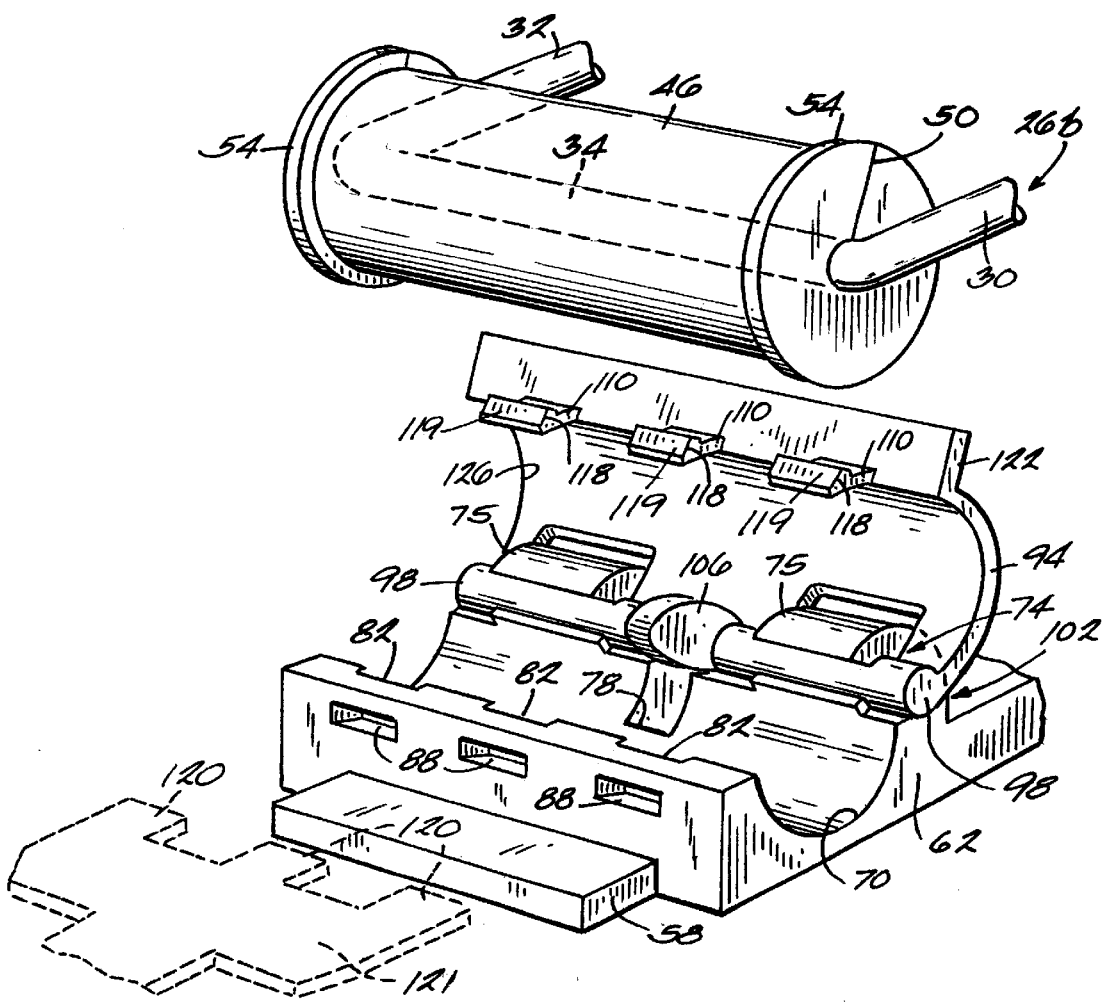
FIG. 2 is a partial perspective view of the device for securing the hydraulic modulator and a portion of the hydraulic modulator of FIG. 1.

As shown in FIGS. 1 and 2, a respective damping element 46 is attached to the connecting portion 34 of each of the mounting members 26a and 26b. An axial cut 50 in each of the damping elements 46 allows the damping elements 46 to be installed on the connecting portions 34 as shown in FIG. 2. In the illustrated embodiment, the damping elements 46 are substantially cylindrical (see FIG. 2), and have flanges 54 located on opposite ends. The purpose of the flanges 54 will be described in detail below. The damping elements 46 are preferably made of rubber, but can be made from any other suitable material for absorbing vibrations, such as foam, plastic and the like.

The device 10 for securing the hydraulic modulator 14 includes a base 58 that is coupled to the mounting surface 18 in the engine compartment of the vehicle. The base 58 is preferably mounted to the mounting surface 18 using bolts, screws or any other appropriate fasteners (not shown). As shown in FIG. 1, the base 58 defines two cradle portions 62a and 62b, which are substantially identical and are oriented in mirrored relation to each other. The cradle portions 62a and 62b will be described in detail below. The base 58 also includes a plurality of stiffening ribs 66 (only one is shown) extending between the two cradle portions 62. The stiffening ribs 66 stiffen the base 58 against any torsional rotation that may occur during movement of the vehicle or operation of the hydraulic modulator 14.

It is understood that while two cradle portions 62a and 62b are shown in the illustrated embodiment, there could be any number of cradle portions 62 formed on the base 58 depending on the configuration of the hydraulic modulator 14 to be secured, and more specifically on the number of mounting members 26 on the hydraulic modulator 14. Since the cradle portions 62a and 62b are substantially identical, only the cradle portion 62b will be described in detail. Like reference numbers will refer to like parts in the cradle portion 62a.

As best shown in FIGS. 1, 2, 4 and 5, the cradle portion 62b defines an arcuate recess 70 in which the damping element 46 of the hydraulic modulator 14 rests when the hydraulic modulator 14 is secured in the device 10. The arcuate surface of the recess 70 forms part of a cylinder. As shown in FIG. 2, the recess 70 includes a secondary recess 78 for a reason explained below. The recess 70 also includes a raised area of material that is formed in the recess 70 of the cradle portion 62. The function of the raised area of material will be described in detail below. However, it is to be understood that the cradle portion 62b can be formed without the recess 70 and that the device 10 could be designed to secure the hydraulic modulator 14 to the device 10 without utilizing a recess 70. In this case, the features of the recess 70 can be formed directly on the base 58.

The cradle portion 62b includes a hook portion 74 adjacent the recess 70. The hook portion 74 comprises part of a hinge, which will be described in detail below. As illustrated in FIG. 3, the hook portion 74 is segmented in to two spaced-apart hooks 75; however, the number of hooks can vary.

The cradle portion 62b further includes three locking recesses 82 (see FIGS. 2 and 5), which are part of a locking mechanism 86 that functions to secure the hydraulic modulator 14 to the device 10. As shown in FIG. 2, the cradle portion 62b also includes apertures 88 that communicate with the locking recesses 82, the purpose of which will be described in detail below. The remainder of the locking mechanism 86 will also be described in detail below.

The device 10 further includes two arcuate clamping portions 94a and 94b, which are also illustrated in FIG. 1. As with the cradle portions 62, the clamping portions 94 are substantially identical and are oriented in mirrored relation to each other. While two clamping portions 94a and 94b are shown in the illustrated embodiment, it is to be understood that there should be a corresponding number of clamping portions 94 and cradle portions 62, depending on the number of mounting members on the hydraulic modulator 14. Since the clamping portions 94a and 94b are substantially identical, only the clamping portion 94b will be described in detail. Like reference numbers will refer to like parts in the clamping portion 94a.

Figure 7:
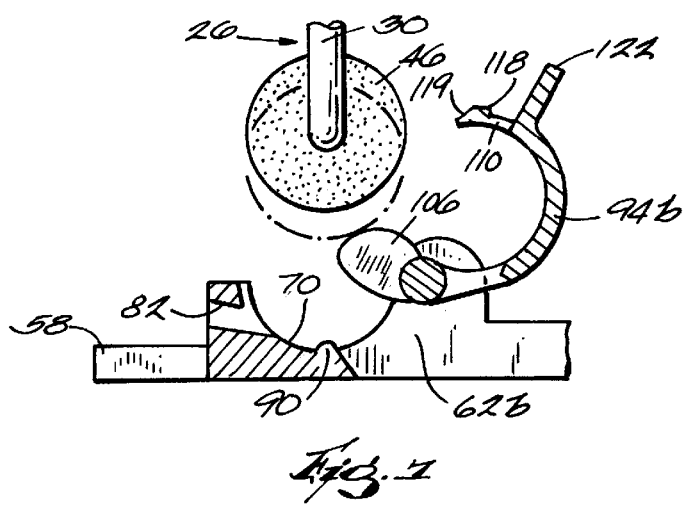
FIG. 7 is a view similar to FIG. 5, showing a portion of the hydraulic modulator prior to insertion into the device.

As best seen in FIG. 2, the clamp 94b includes a rod portion 98 that snaps into the hook portion 74 to form a movable hinge 102. The clamp 94b is then movable on this hinge 102 from a first, or open position (see FIG. 7), which allows the damping element 46 to be positioned on the base 58, to a second, or closed position (see FIG. 9) in which the clamp 94b is closed over the base 58 to secure the hydraulic modulator 14 to the vehicle.

The clamp portion 94b further includes a projection 106 that extends from the rod portion 98. The projection 106 may be formed with or attached to the rod portion 98 and is designed to automatically move the clamp portion 94b from the open position toward the closed position as the damping element 46 is brought into engagement with the base 58. As shown in FIG. 4, the projection 106 preferably extends over the recess 70 when the clamp 94b is in the open position. As the damping element 46 is positioned in the recess 70 (see FIGS. 7 and 8), the damping element 46 engages the projection 106, which moves the clamp 94b from the open position toward the closed position. As the clamp 94b is moved toward the closed position, the projection 106 enters the secondary recess 78 and thereby allows the damping element 46 to move fully into the recess 70 (see FIG. 9).

Figure 10:
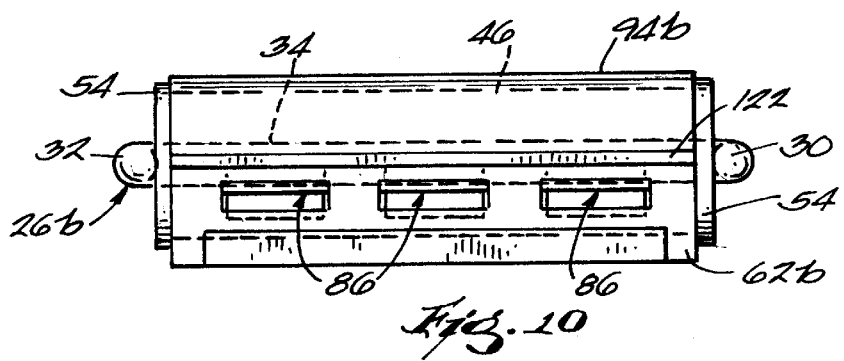
FIG. 10 is a front view, taken along line 10—10 of FIG. 9, showing the device in the closed position.

To lock the clamp portion 94b in the closed position, the device 10 includes the locking mechanism 86, which is best illustrated in FIGS. 2 and 6. The locking mechanism 86 is comprised of three resilient locking members in the form of locking protrusions 110 that are located on the clamp 94b. The locking protrusions 110 each include a shoulder 118 that acts like a hook to secure the locking protrusion 110 in place in the locking recess 82. Each shoulder 118 includes a ramped cam surface 119 that deflects when the locking protrusions 110 enter the locking recesses 82 so that the locking protrusions 110 snap into place. As shown in FIG. 10, should one locking member 110 fail, the other locking members 110 will act as back-ups to ensure that the clamp 94b remains closed and locked. It should be understood that the parts of the locking mechanism 86 can be interchanged so that the locking members 110 could be located on the cradle portion 62b and that the locking recesses 82 could be formed in the clamping portion 94b.

To open the clamp 94b, the prongs 120 of a tool 121 are inserted into each of the apertures 88 (see FIG. 2). The prongs 120 cause the locking protrusions 110 to deflect such that the shoulders 118 are disengaged from the locking recesses 82, allowing the clamp 94b to be opened. Of course, the locking mechanism 86 can include any number of locking protrusions 110 and mating locking recesses 82. In addition, other types of locking mechanisms known in the art can be substituted.

Figures 8, 9:
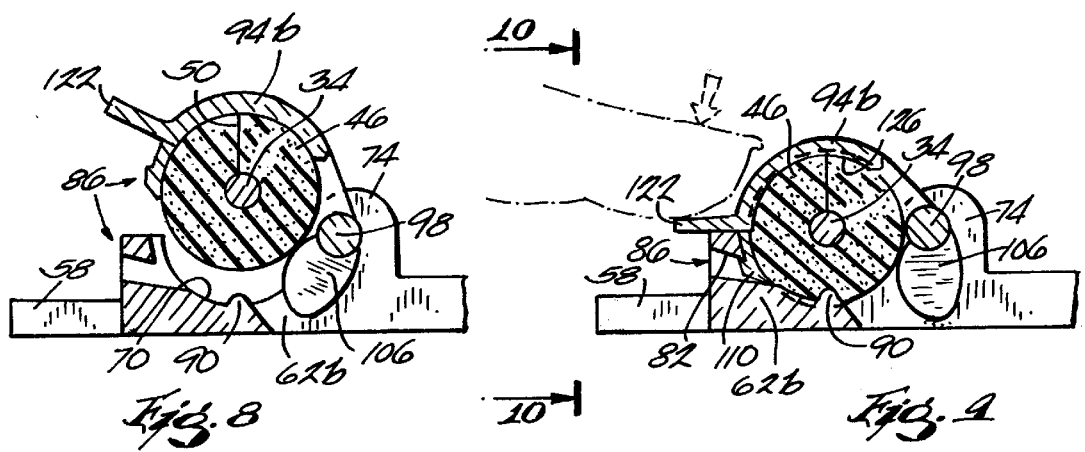
FIG. 8 is a view similar to FIG. 7, showing the portion of the hydraulic modulator being inserted into the device.
FIG. 9 is a view similar to FIG. 8, showing the portion of the hydraulic modulator secured in the device.

The clamp portion 94b also includes a flange 122 that is used to facilitate locking the clamp portion 94b in the closed position. As shown in FIG. 9, manual pressure is applied downwardly on the flange 122 until the shoulders 118 are engaged and secured in the recesses 82, thereby securing the clamp 94b in the closed position. With the clamp 94b closed and locked, the hydraulic modulator 14 is secured to the device 10. While the flange 122 is shown as a single, elongated flange, a shorter or segmented flange could also be used.

As illustrated in FIG. 9, the clamp portion 94b includes an arcuate inner engaging surface 126 that engages and compresses the damping element 46 as the clamp portion 94b is moved toward and is locked in the closed position. Like the arcuate surface of the recess 70, the arcuate inner engaging surface 126 forms part of a cylinder. The compression of the damping element 46 also helps secure the hydraulic modulator 14 to the device 10 by creating a counter-active pressure (upward in FIG. 9) on the clamp 94b that substantially prevents the locking mechanism 86 from opening during vehicle or hydraulic modulator 14 vibrations.

The area of raised material 90 formed in the recess 58 accentuates the compression, and therefore the counter-active force created by the damping element 46. This raised material 90 causes greater compression of the damping element 46, which increases the counter-active force applied to the clamp 94b to secure the locking protrusions 110 in the locking recesses 82. In FIG. 3, the raised area of material 90 is shown as two bumps formed in the recess 70, however, it is understood that other configurations of raised material may be used to cause greater compression. Of course, the raised material 90 need not be present if compression of the damping element 46 is otherwise sufficient. Alternatively, the damping element 46 could be enlarged to achieve the desired compression of the damping element 46 and the desired counter-active force.

FIG. 10 illustrates how the flanges 54, which are located on the opposite ends of the damping element 46, vibrationally isolate the mounting member 26b from the cradle portion 62b and the clamping portion 94b when the damping element 46 is secured in the base 58. The flanges 54 extend out and overlap the ends of the cradle portion 62b and the clamping portion 94b to isolate the mounting member 26b from both the cradle portion 62b and the clamping portion 94b.

FIGS. 1, 7, 8 and 9 illustrate how the device 10 is utilized to secure the hydraulic modulator 14 to the vehicle without the use of tools. Once the device 10 has been mounted on the mounting surface 18, the damping element 46 that is attached to the mounting member 26 of the hydraulic modulator 14 is positioned in the recess 70 that is formed in the base 58 of the device 10. The damping element 46 engages the projection 106 and causes the clamp 94b to move from the open position (see FIG. 7) toward the closed position (see FIG. 8). Finally, manual pressure is applied to the flange 122 until the locking members 110 are snapped into the locking recesses 82 to secure the damping element 46 in the recess 70. This allows the hydraulic modulator 14 to be secured in the device 10 without the use of tools. This process is repeated for each clamp 94.

Removing the hydraulic modulator 14 from the device 10 occurs in substantially the reverse order. The tool 121 is used to release the locking mechanism 86. The counter-active force created by the compressed damping element 46 causes the clamps 94 to open. The operator may also use the flange 122 to help open the clamps 94. Once all the clamps 94 are opened, the hydraulic modulator 14 can be removed from the device 10.

Various features of the invention are set forth in the following claims.

What is claimed is:

1. An assembly comprising:
   a hydraulic modulator having first and second mounting portions; and
   a device for securing the hydraulic modulator to a vehicle, the device having
      a base for receiving the first and second mounting portions of the hydraulic modulator;
      a first clamp movably connected to the base and movable between a first position, wherein the first mounting portion of the hydraulic modulator can be positioned on the base, and a second position, wherein the first clamp is closed over the base to secure the first mounting portion of the hydraulic modulator to the base; and
      a second clamp movably connected to the base and movable independently of the first clamp between a first position, wherein the second mounting portion of the hydraulic modulator can be positioned on the base, and a second position, wherein the second clamp is closed over the base to secure the second mounting portion of the hydraulic modulator to the base;
      wherein at least one of the first and second clamps further comprises a projection operable to move the respective clamp from the first position toward the second position when the projection is engaged by the respective mounting portion of the hydraulic modulator.

2. The assembly of claim 1, wherein the base defines a first recess for receiving the first mounting portion of the hydraulic modulator and a second recess for receiving the second mounting portion of the hydraulic modulator.

3. The assembly of claim 2, wherein the first clamp is movably connected to the base adjacent the first recess and the second clamp is movably connected to the base adjacent the second recess.

4. The assembly of claim 2, wherein the base includes a rib extending between the two recesses to increase torsional stiffness of the base.

5. The assembly of claim 1, wherein the first and second clamps are each connected to the base by a respective hinge.

6. The assembly of claim 1, wherein the device includes a locking mechanism for each clamp to secure each clamp in the respective second position.

7. The assembly of claim 6, wherein each clamp includes a flange extending therefrom so that pressure can be applied to the flange of each clamp to facilitate locking each clamp in the respective second position.

8. The assembly of claim 1, wherein the first and second clamps are substantially identical.

9. The assembly of claim 1, wherein each clamp includes a rod portion configured to be received in a respective hook portion of the base to form a movable hinge.

10. The assembly of claim 9, wherein the first clamp includes a first projection and the second clamp includes a second projection, and wherein the first projection extends from the rod portion of the first clamp and the second projection extends from the rod portion of the second clamp.

11. An assembly comprising:
   a hydraulic modulator including first and second substantially rigid mounting members extending therefrom;
   a first damping element coupled to the first mounting member;
   a second damping element coupled to the second mounting member; and
   a device for securing the hydraulic modulator in a vehicle, the device having
      a base for receiving each damping element and each mounting member;
      a first clamp movably connected to the base and movable between a first position, wherein the first damping element and the first mounting member can be positioned on the base, and a second position, wherein the first clamp is closed over the first damping element and the first mounting member to secure the hydraulic modulator to the base, the first clamp including a first projection operable to move the first clamp from the first position toward the second position when the first projection is engaged by the first damping element, and
      a second clamp movably connected to the base and movable independently of the first clamp between a first position, wherein the second damping element and the second mounting member can be positioned on the base, and a second position, wherein the second clamp is closed over the second damping element and the second mounting member to secure the hydraulic modulator to the base, the second clamp including a second projection operable to move the second clamp from the first position toward the second position when the second projection is engaged by the second damping element.

12. The assembly of claim 11, wherein each clamp is independently hinged to the base.

13. The assembly of claim 11, wherein the assembly includes a locking mechanism for each clamp to secure each clamp in the respective second position.

14. The assembly of claim 13, wherein each clamp includes a flange extending therefrom so that pressure can be applied to the flange of each clamp to facilitate locking each clamp in the respective second position.

15. The assembly of claim 11, wherein the base includes first and second areas of raised material on the base, the first area of raised material exerting a counter-active force on the first damping element as the first clamp is moved to the second position and the second area of raised material exerting a counter-active force on the second damping element as the second clamp is moved to the second position.

16. The assembly of claim 11, wherein each clamp includes a rod portion configured to be received in a respective hook portion of the base to form a movable hinge.

17. The assembly of claim 16, wherein the first projection extends from the rod portion of the first clamp and the second projection extends from the rod portion of the second clamp.

18. A method of securing a hydraulic modulator in a vehicle, the hydraulic modulator including first and second mounting members extending therefrom, the method comprising:

placing a first damping element on the first mounting member;

placing a second damping element on the second mounting member;

coupling a securing device to the vehicle, the securing device including a base for receiving each of the damping elements, a first clamp hingedly connected to the base and movable between a first position, wherein the first damping element can be positioned on the base, and a second position, wherein the first clamp is closed over the first damping element to secure the hydraulic modulator to the base, and a second clamp hingedly connected to the base and movable independently of the first clamp between a first position, wherein the second damping element can be positioned on the base, and a second position, wherein the second clamp is closed over the second damping element to secure the hydraulic modulator to the base;

positioning the first and second damping elements on the base; and moving the clamps to the respective second positions;

wherein each clamp includes a projection that extends over the base when the clamp is in the first position, and wherein positioning the first and second damping elements onto the base includes engaging the projection on the first clamp with the first damping element and engaging the projection on the second clamp with the second damping element to automatically move each of the clamps from the first position toward the second position.

19. The method of claim 18, wherein the base includes first and second recesses and wherein positioning the first and second damping elements on the base includes positioning the first damping element in the first recess and positioning the second damping element in the second recess.

20. The method of claim 18, wherein each clamp further includes a flange extending therefrom, and wherein moving the clamps to the respective second positions includes manually applying force to the flange of each clamp until the clamps snap into the respective second positions.

21. The method of claim 18, wherein moving the clamps to the respective second positions includes compressing the damping elements between the respective clamps and the base.

22. The method of claim 21, wherein the compressing act is facilitated by first and second areas of raised material on the base, the first area of raised material exerting a counter-active force on the first damping element as the first clamp is moved to the second position and the second area of raised material exerting a counter-active force on the second damping element as the second clamp is moved to the second position.

23. The method of claim 18, wherein positioning the first and second damping elements on the base includes lowering the hydraulic modulator substantially vertically until the first damping element engages the projection on the first clamp and the second damping element engages the projection on the second clamp.

24. The method of claim 18, wherein moving the clamps to the respective second positions is achieved without the use of tools.

25. An assembly comprising:

a hydraulic modulator including a substantially rigid, generally U-shaped mounting member extending therefrom;

a damping element coupled to the mounting member; and a device for securing the hydraulic modulator in a vehicle, the device having a base for receiving a portion of the damping element and a portion of the mounting member; and a clamp movably connected to the base and movable between a first position, wherein the portion of the damping element and the mounting member can be positioned on the base, and a second position, wherein the clamp is closed over the damping element and the mounting member to secure the hydraulic modulator to the base.

26. The assembly of claim 25, wherein the damping element is substantially cylindrical and includes an axial cut to facilitate coupling the damping element to the mounting member.

27. The assembly of claim 25, wherein the damping element includes flanges located on opposite ends to further isolate the device from the mounting member.

28. The assembly of claim 25, wherein the hydraulic modulator includes an additional substantially rigid mounting member extending therefrom and wherein the device includes an additional clamp movably connected to the base.

29. The assembly of claim 25, wherein the clamp includes a projection that extends over the base when the clamp is in the first position so that when the projection is engaged by the portion of the hydraulic modulator, the projection will automatically move the clamp from the first position toward the second position.

30. The assembly of claim 25, wherein the assembly includes a locking mechanism to secure the clamp in the second position.

31. The assembly of claim 30, wherein the clamp includes a flange extending therefrom so that pressure can be applied to the flange to facilitate locking the clamp in the second position.

32. The assembly of claim 25, wherein the base includes an area of raised material on the base that exerts a counter-active force on the damping element as the clamp is moved to the second position.

33. An assembly comprising:

a hydraulic modulator including a substantially rigid mounting member extending therefrom;

a damping element coupled to the mounting member, the damping element being substantially cylindrical and including an axial cut to facilitate coupling the damping element to the mounting member; and a device for securing the hydraulic modulator in a vehicle, the device having a base for receiving a portion of the damping element and a portion of the mounting member; and a clamp movably connected to the base and movable between a first position, wherein the portion of the damping element and the mounting member can be positioned on the base, and a second position, wherein the clamp is closed over the damping element and the mounting member to secure the hydraulic modulator to the base.

34. The assembly of claim 33, wherein the substantially rigid mounting member is generally U-shaped.

35. The assembly of claim 33, wherein the damping element includes flanges located on opposite ends to further isolate the device from the mounting member.

36. The assembly of claim 33, wherein the hydraulic modulator includes an additional substantially rigid mounting member extending therefrom and wherein the device includes an additional clamp movably connected to the base.

37. The assembly of claim 33, wherein the clamp includes a projection that extends over the base when the clamp is in the first position so that when the projection is engaged by the portion of the hydraulic modulator, the projection will automatically move the clamp from the first position toward the second position.

38. The assembly of claim 33, wherein the assembly includes a locking mechanism to secure the clamp in the second position.

39. The assembly of claim 38, wherein the clamp includes a flange extending therefrom so that pressure can be applied to the flange to facilitate locking the clamp in the second position.

40. The assembly of claim 33, wherein the base includes an area of raised material on the base that exerts a counter-active force on the damping element as the clamp is moved to the second position.

41. An assembly comprising:
a hydraulic modulator including a substantially rigid mounting member extending therefrom;
a damping element coupled to the mounting member, the damping element including flanges located on opposite ends to further isolate the device from the mounting member; and
a device for securing the hydraulic modulator in a vehicle, the device having
a base for receiving a portion of the damping element and a portion of the mounting member; and
a clamp movably connected to the base and movable between a first position, wherein the portion of the damping element and the mounting member can be positioned on the base, and a second position, wherein the clamp is closed over the damping element and the mounting member to secure the hydraulic modulator to the base.

42. The assembly of claim 41, wherein the substantially rigid mounting member is generally U-shaped.

43. The assembly of claim 41, wherein the damping element is substantially cylindrical and includes an axial cut to facilitate coupling the damping element to the mounting member.

44. The assembly of claim 41, wherein the hydraulic modulator includes an additional substantially rigid mounting member extending therefrom and wherein the device includes an additional clamp movably connected to the base.

45. The assembly of claim 41, wherein the clamp includes a projection that extends over the base when the clamp is in the first position so that when the projection is engaged by the portion of the hydraulic modulator, the projection will automatically move the clamp from the first position toward the second position.

46. The assembly of claim 41, wherein the assembly includes a locking mechanism to secure the clamp in the second position.

47. The assembly of claim 46, wherein the clamp includes a flange extending therefrom so that pressure can be applied to the flange to facilitate locking the clamp in the second position.

48. The assembly of claim 41, wherein the base includes an area of raised material on the base that exerts a counter-active force on the damping element as the clamp is moved to the second position.

* * * * *